United States Patent
Kwan et al.

(10) Patent No.: US 9,106,800 B2
(45) Date of Patent: Aug. 11, 2015

(54) SYSTEM AND METHOD OF MONITORING VIDEO DATA PACKET DELIVERY

(75) Inventors: Dick Kwan, San Mateo, CA (US); Zhi Li, Martinez, CA (US); Raghvendra Savoor, Walnut Creek, CA (US); Kapil Shrikhande, Berkeley, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1871 days.

(21) Appl. No.: 11/848,871

(22) Filed: Aug. 31, 2007

(65) Prior Publication Data
US 2009/0064248 A1   Mar. 5, 2009

(51) Int. Cl.
| | |
|---|---|
| H04N 7/16 | (2011.01) |
| H04L 12/56 | (2006.01) |
| H04L 12/18 | (2006.01) |
| H04N 21/239 | (2011.01) |
| H04N 21/24 | (2011.01) |
| H04N 21/258 | (2011.01) |
| H04N 21/643 | (2011.01) |
| H04N 7/173 | (2011.01) |
| G06F 15/16 | (2006.01) |

(52) U.S. Cl.
CPC ........ *H04N 7/17318* (2013.01); *H04L 12/1868* (2013.01); *H04N 21/2393* (2013.01); *H04N 21/2404* (2013.01); *H04N 21/258* (2013.01); *H04N 21/64322* (2013.01)

(58) Field of Classification Search
USPC ............. 709/224; 714/25, 748, 18, 749, 47.1, 714/47.2; 725/112, 113, 107, 118, 119; 370/242; 348/192
See application file for complete search history.

(56) References Cited

U.S. PATENT DOCUMENTS

| | | | | |
|---|---|---|---|---|
| 5,913,041 | A * | 6/1999 | Ramanathan et al. | 709/233 |
| 6,006,260 | A * | 12/1999 | Barrick et al. | 709/224 |
| 6,088,721 | A * | 7/2000 | Lin et al. | 709/214 |
| 6,345,038 | B1 * | 2/2002 | Selinger | 370/230 |
| 6,438,592 | B1 * | 8/2002 | Killian | 709/224 |
| 6,442,614 | B1 * | 8/2002 | Rahman | 709/239 |
| 6,577,599 | B1 * | 6/2003 | Gupta et al. | 370/236 |
| 6,914,883 | B2 | 7/2005 | Dharanikota | |
| 7,003,575 | B2 * | 2/2006 | Ikonen | 709/228 |
| 7,080,398 | B1 * | 7/2006 | Wichelman et al. | 725/107 |
| 7,082,133 | B1 | 7/2006 | Lor et al. | |
| 7,170,905 | B1 | 1/2007 | Baum et al. | |
| 7,197,557 | B1 * | 3/2007 | Asar et al. | 709/224 |
| 7,215,637 | B1 | 5/2007 | Ferguson et al. | |
| 7,383,473 | B2 * | 6/2008 | Johnson | 714/43 |
| 7,647,418 | B2 * | 1/2010 | Ash et al. | 709/231 |

(Continued)

OTHER PUBLICATIONS

Alcatel 7750 SR Service Router—Release 3.0, www.alcatel.com, (10 pgs).

(Continued)

*Primary Examiner* — Pankaj Kumar
*Assistant Examiner* — Reuben M Brown
(74) *Attorney, Agent, or Firm* — Toler Law Group, PC

(57) ABSTRACT

Systems and methods of monitoring packet delivery are disclosed. In an embodiment, a method is disclosed that includes querying multiple network devices for performance metrics corresponding to video data packets sent from a video server. The network devices may include multicast branching points between the video server and the destination. A delivery failure may be identified based on the performance metrics, and a response to the delivery failure may be initiated.

28 Claims, 8 Drawing Sheets

(56) References Cited

U.S. PATENT DOCUMENTS

| | | | |
|---|---|---|---|
| 7,788,424 B2* | 8/2010 | Sharma et al. | 710/30 |
| 7,995,485 B1* | 8/2011 | Anderson et al. | 370/242 |
| 2002/0065922 A1* | 5/2002 | Shastri | 709/227 |
| 2002/0136164 A1* | 9/2002 | Fukuda et al. | 370/230 |
| 2003/0048750 A1 | 3/2003 | Kobayashi | |
| 2005/0058149 A1 | 3/2005 | Howe | |
| 2005/0086342 A1* | 4/2005 | Burt et al. | 709/224 |
| 2005/0094640 A1 | 5/2005 | Howe | |
| 2006/0159024 A1* | 7/2006 | Hester | 370/242 |
| 2006/0209807 A1 | 9/2006 | Lor et al. | |
| 2006/0227714 A1* | 10/2006 | Griffin et al. | 370/241 |
| 2007/0008884 A1 | 1/2007 | Tang | |
| 2007/0058043 A1* | 3/2007 | Thukral | 348/180 |
| 2007/0214394 A1* | 9/2007 | Gross et al. | 714/47 |
| 2007/0256096 A1* | 11/2007 | Wilhelm | 725/34 |
| 2008/0148329 A1* | 6/2008 | Costa et al. | 725/109 |
| 2008/0229153 A1* | 9/2008 | Li et al. | 714/39 |
| 2008/0232269 A1* | 9/2008 | Tatman et al. | 370/252 |
| 2008/0288977 A1* | 11/2008 | Howcroft et al. | 725/37 |
| 2009/0003360 A1* | 1/2009 | Zhao et al. | 370/401 |
| 2009/0030942 A1* | 1/2009 | Jiang | 707/104.1 |
| 2009/0034426 A1* | 2/2009 | Luft et al. | 370/252 |
| 2009/0271683 A1* | 10/2009 | Costa et al. | 714/752 |
| 2010/0027411 A1* | 2/2010 | Weber et al. | 370/216 |
| 2011/0249553 A1* | 10/2011 | Wang et al. | 370/230 |

OTHER PUBLICATIONS

Application Note—Assured Quality of Experience—Maximizing Profits Through Service Reliability, Alacatel-Lucent, www.alcatel-lucent.com, (16 pgs).

Alcatel 8920 Traffic Management & Service Monitoring Application—Multi-domain, end-to-end traffic management, www.alcatel.com (4 pgs).

Alcatel SR OS—Service Routing Operating System—Release 3.0, www.alcatel.com (8 pgs).

* cited by examiner

SYSTEM AND METHOD OF MONITORING VIDEO DATA PACKET DELIVERY

FIELD OF THE DISCLOSURE

The present disclosure is generally related to monitoring video data packet delivery.

BACKGROUND

Multimedia content can be delivered from a source to a receiver via a stream of video data packets. Image quality may be affected by the loss of one or more packets of the stream of video data packets. Packet losses can be caused by network congestion, packet errors, network device failures, other causes, or any combination thereof. Hence, there is a need for an improved system and method of monitoring video data packet delivery.

DETAILED DESCRIPTION

Figure 1:
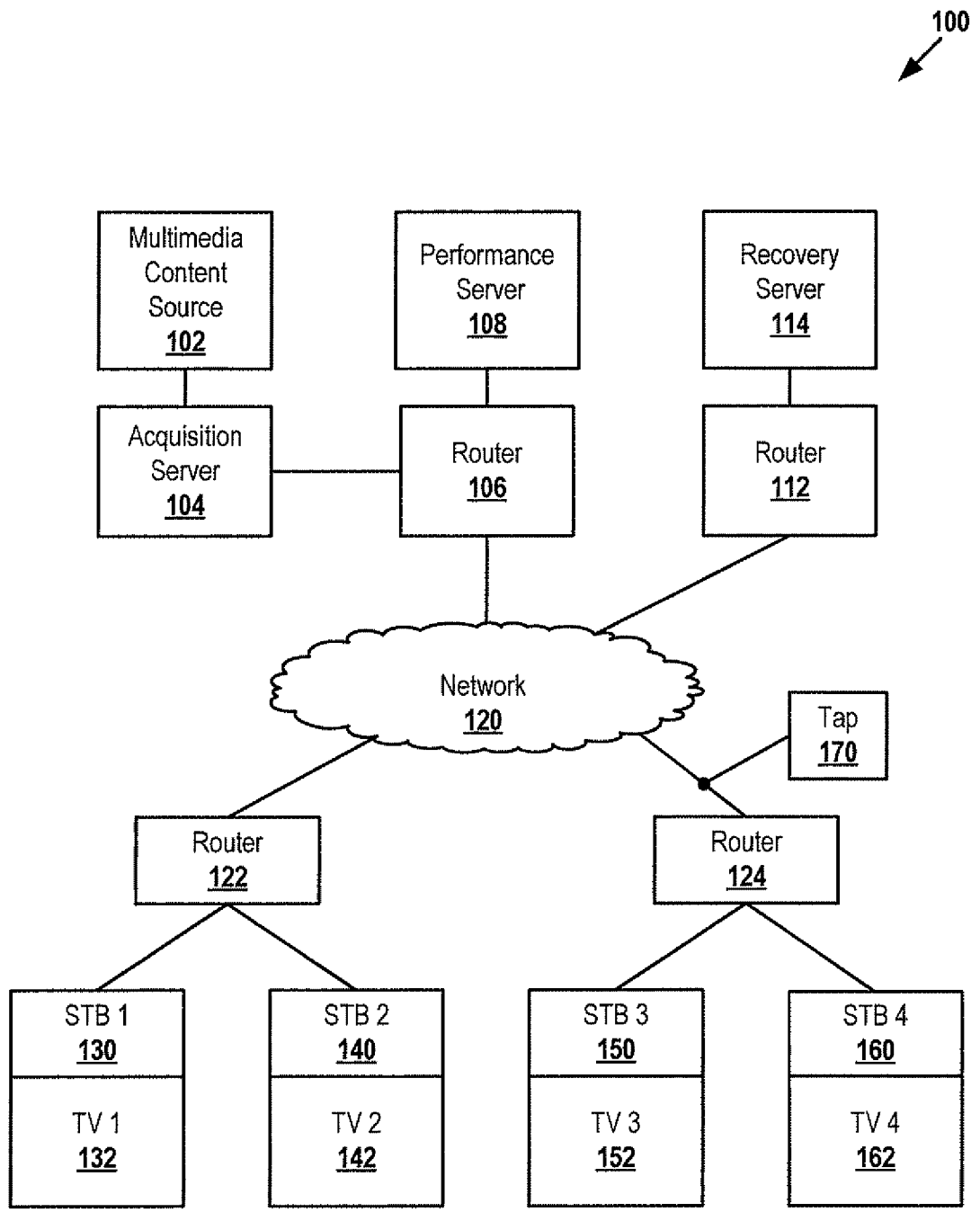
FIG. 1 is a block diagram of a particular embodiment of a system to monitor video data packet delivery.

In a particular embodiment, a system is disclosed that includes a processor and a network interface accessible to the processor. The system also includes a memory accessible to the processor, the memory having instructions to cause the processor to execute a method. The method includes determining that a number of multicast video data packets not received at a multicast destination exceeds a threshold, the multicast video data packets sent from a video server to the multicast destination. The method includes querying a plurality of network devices for performance metrics corresponding to the multicast video data packets. The method includes identifying a delivery failure. The method further includes initiating a response to the delivery failure.

In another embodiment, a system is disclosed that includes a first network interface to communicate with a first network and a second network interface to communicate with a second network. The system also includes a processor coupled to the first network interface and the second network interface. The system father includes a memory accessible to the processor, the memory having instructions to cause the processor to execute a method. The method includes receiving video data packets at the first network interface, the video data packets sent to a multicast destination coupled to the second network. The method also includes recording performance data associated with the video data packets. The method includes determining a trend based on the performance data. The method further includes sending a warning to a server, the warning indicating that the performance metric is predicted to exceed a threshold.

In another embodiment, a method of monitoring video data packet delivery is disclosed. The method includes querying a plurality of network devices for performance metrics corresponding to multicast video data packets, the multicast video data packets sent from a video server of an internet protocol television system to a multicast destination. The plurality of network devices includes multicast branching points between the video server and the multicast destination. The method includes identifying a delivery failure based on the performance metrics. The method also includes initiating a response to the delivery failure.

In another embodiment, a second method of monitoring video data packet delivery is disclosed. The method includes monitoring video data packets in transit to a multicast destination, the video data packets associated with an internet protocol (IP) multicast transmission. The method includes recording performance data associated with a performance metric based on the video data packets. The method includes determining a trend based on the performance data. The method further includes sending a warning to a server, the warning identifying the performance metric and a threshold.

In another embodiment, a computer readable medium is disclosed. The computer readable medium has computer readable instructions to cause a processor to execute a method. The method includes recording a first number of lost video packets of a multicast transmission that are not received at a multicast destination from a first server. The method includes recording a second number of lost retransmission packets that are requested from the first server but not received at the multicast destination. The method also includes sending a message to a second server when at least one of the first number and the second number exceeds a threshold.

Referring to FIG. 1, a particular embodiment of a system to monitor video data packet delivery is depicted and generally designated 100. The system 100 includes a multimedia content source 102 that can communicate with a video content acquisition server 104. The acquisition server 104 is adapted to communicate with a performance server 108 via a first representative router 106. The acquisition server 104 can communicate with a video packet loss recovery server 114 via the first representative router 106, a network 120 and a second representative router 112. In a particular illustrative embodiment, the network 120 may be a public internet protocol (IP) network, a private IP network, or any combination thereof. Further, the recovery server 114 can communicate with a plurality of set-top boxes via the second router 112, the network 120, and routers 122 and 124. For instance, the recovery server 114 can communicate with a first set-top box device (STB) 130 and a second STB 140, via the third representative router 122, and can communicate with a third STB 150 and a fourth STB 160 via the fourth representative router 124. Each STB 130, 140, 150, and 160 may be coupled to a display device such as a first television 132, a second television 142, a third television 152, and a fourth television 162, respectively. A tap 170 to monitor network communications without functioning as a switch or a router may be coupled to a communication path between the network 120 and the fourth router 124.

In a particular illustrative embodiment, the multimedia content source 102 can provide multimedia content to the acquisition server 104 for distribution. As illustrative, non-limiting examples, the multimedia content source 102 can include a television content provider, other sources of multimedia content, or any combination thereof.

In a particular illustrative embodiment, the acquisition server 104 may be adapted to encode the multimedia content for transmission to the recovery server 114 via the first router 106, the network 120, and the second router 112. The acquisition server 104 may be adapted to encapsulate the multimedia content into a sequence of media content data packets for delivery to the recovery server 114. In a particular embodiment, the media content packets may be encoded as Internet Protocol (IP) packets. In a particular embodiment, the acquisition server 104 may be adapted to transmit the multimedia content via one or more streams of media content packets to multiple multicast destinations, such as multiple recovery servers 114, to one or more of the STBs 130, 140, 150, and 160, to other end-user or network resources (not shown) that are capable of receiving multicast video data packets, or any combination thereof. In an illustrative embodiment, the acquisition server 104 may be adapted to transmit video data via IP multicast using Real-time Transport Protocol (RTP).

In a particular embodiment, the acquisition server 104 may be adapted to receive requests to resend packets and may be adapted to resend the requested packets. In a particular embodiment, the acquisition server 104 may be adapted to track metrics associated with one or more multicast receivers based on the received requests to resend the packets. Such multicast receivers can include the recovery server 114, one or more of the STBs 130, 140, 150, and 160, other multicast receivers (not shown), or any combination thereof. In a particular non-limiting example, the acquisition server 104 may be adapted to record data corresponding to lost packets, such as a lost packet identifier, a number or identification of multicast receivers that did not receive an identified packet, or a number or identification of multicast receivers that did not receive a retransmitted video data packet.

In a particular embodiment, the acquisition server 104 may be adapted to determine when one or more tracked metrics meets or exceeds one or more thresholds and to notify the performance server 108 based on the determination. In an illustrative embodiment, a threshold may correspond to a number of lost packets to a single multicast destination, a total number of lost packets for all multicast destinations, a sum of lost multicast packets and failed retransmission packets, or any combination thereof. In an illustrative embodiment, the threshold may be related to a specified time interval, such as a number of lost packets per hour. In another illustrative embodiment, the threshold may be based on a relative amount, such as a ratio of lost packets to total transmitted packets.

In a particular illustrative embodiment, the acquisition server 104 may be adapted to determine a trend in the tracked metrics and to generate an alert or message to the performance server 108 when a threshold is predicted to be exceeded based on the trend. In a particular embodiment, the acquisition server 104 may be adapted to predict an amount of time before one or more thresholds is reached. The A-server may be adapted to send a message to the performance server 108 when the predicted amount of time is less than a predetermined amount of time.

In a particular embodiment, the recovery server 114 may be adapted to receive multimedia content from the acquisition server 104 and to store, format, encode, replicate, or otherwise manipulate or prepare the multimedia content for communication to the set-top box devices 130, 140, 150, and 160. In a particular embodiment, the recovery server 114 may be adapted to detect when one or more packets of a multicast transmission are not received at the recovery server 114. In a particular embodiment, each transmitted multicast packet may be associated with a multicast packet sequence number. The recovery server 114 may be adapted to identify missing packets by sequence number and to transmit a request that identifies missing sequence numbers to the acquisition server 104.

In a particular embodiment, the recovery server 114 may be adapted to track data associated with one or more performance metrics and to notify the performance server 108 when one or more thresholds has been met or exceeded. In a particular embodiment, the recovery server 114 may be adapted to track data associated with lost multicast packets not received from the acquisition server 104. The recovery server 114 may be adapted to track failed redelivery requests for lost multicast packets from the acquisition server 104. In a particular embodiment, the recovery server 114 may be adapted to track multicast packet loss to one or more of the STBs 130, 140, 150, and 160. In a particular embodiment, the recovery server 114 may be adapted to track packet retransmission failures to one or more of the STBs 130, 140, 150, and 160.

In a particular embodiment, the recovery server 114 may be adapted to send a message to the performance server 108 when one or more one or more performance metrics meet or exceed a respective threshold. In a particular embodiment, the recovery server 114 may be adapted to predict a future threshold crossing of one or more of the performance metrics by extrapolating a trend in the performance data. In a particular embodiment, the recovery server 114 may be adapted to send a warning to the performance server 108 identifying the predicted threshold crossing.

In a particular embodiment the set-top box devices 130, 140, 150, and 160 may be adapted to detect when one or more packets of the multimedia content are not received. In an illustrative embodiment, each STB 130, 140, 150, and 160 may be adapted to buffer received packets by packet sequence number and to transmit a request identifying missing packet sequence numbers to the recovery server 114. In a particular embodiment, one or more of the STBs 130, 140, 150 and 160 may be adapted to track performance data such as a number of lost multicast packets, a number of failed packet redelivery requests, or any combination thereof. In a particular embodiment, the STBs 130, 140, 150, and 160 may be adapted to detect when performance metrics indicate a trend that exceeds or will exceed a threshold and to send a message identifying the predicted or actual threshold crossing to the performance server 108.

In a particular embodiment, one or more of the representative routers 106, 112, 122, and 124 may be adapted to monitor multicast traffic and to record performance data associated with one or more multicast transmissions. In a particular embodiment, the routers 106, 112, 122, and 124 may be adapted to record performance data in response to receiving an instruction from the performance server 108. The routers 106, 112, 122, and 124 may be adapted to send requested information to the performance server 108 automatically or upon receiving a request.

In a particular embodiment the routers 106, 112, 122, and 124 may be adapted to receive and to access signature data associated with one or more delivery failures. The signature data may include network performance data that is characteristic of an impending delivery failure. The routers 106, 112, 122, and 124 may be adapted to compare performance data to the signature data to predict a potential delivery failure or to diagnose at least a portion of an actual delivery failure. The routers 106, 112, 122, and 124 may be adapted to send a message to the performance server 108 identifying a predicted or diagnosed delivery failure.

In a particular embodiment, the routers 106, 112, 122, and 124 may be adapted to perform deep packet inspection of multicast traffic, unicast traffic, or any combination thereof. In a particular embodiment, the routers 106, 112, 122, and 124 may be configured to record data from the deep packet inspection, such as identifying multicast packets that are lost by detecting missing multicast sequence identifiers, or detecting multicast packets not received at one or more downstream multicast destinations by inspecting packet redelivery requests from the multicast destinations.

In a particular embodiment the tap 170 may include a device that is adapted to perform packet traffic monitoring, deep packet inspection, and other functions in a manner substantially similar to the routers 106, 112, 122, and 124, but may not include a switch or router. In an illustrative embodiment, the router 124 may not be configured to monitor video data packet delivery, and instead the tap 170 may perform the monitoring for the multicast branch from the access network 120 to the router 124.

In a particular embodiment, the performance server 108 may be adapted to monitor video data packet delivery. In a particular embodiment, the performance server 108 may be adapted to receive messages indicating delivery failures, such as from the recovery server 114, one or more of the STBs 130, 140, 150, and 160, one or more other devices coupled to the access network 120 to receive video data (not shown), or any combination thereof. In a particular embodiment, the performance server 108 may be adapted to identify one or more delivery failures and the initiate a response. In a particular embodiment, the response may include sending a notice to one or more administrators of the system 100, automatically redirecting network traffic, sending instructions to network devices to provide performance data for diagnostics, other responses appropriate to the delivery failure, or any combination thereof.

During operation, data associated with video data packet traffic to the STBs 130, 140, 150 and 160 may be tracked and used for determining trends and predicting future delivery problems. Video quality at a receiver, such as the STBs 130, 140, 150 and 160, may be estimated by tracking video data packet traffic at a location between a video content source and the receiver. Generally, estimates of video quality at a receiver become more accurate as the video packet traffic flow is monitored nearer to the receiver. However, continual monitoring of video data packet traffic at each receiver can be prohibitively expensive and resource-intensive. Therefore, video quality at the receivers may be monitored via requests to the recovery server 114 to resend video data packets.

In a particular embodiment, requests to resend lost packets and failed retransmissions may be monitored at the router 112 or at the recovery server 114. Such requests provide information that enables estimation of video quality at the STBs 130, 140, 150, and 160 without continually monitoring actual video data packet traffic. Monitored data may include a number of consecutive lost packets and intervals between packet losses. Other information that may be monitored includes packet loss ratio, latency, MPEG2 TS header impairment, or any other data associated with receiving video data multicast packets.

Estimates of video quality based solely on monitoring requests to the recovery server 114 may be limited by factors such as lost requests, single requests that are transmitted multiple times, multiple packets requested in a single request, or other factors. These estimates may be improved by including deep packet inspection at the monitoring device, such as at the router 112. For example, deep packet inspection may identify multiple video data packets in a single request, may detect duplicate requests for a video data packet, or may otherwise improve accuracy of the video quality estimates.

The performance server 108 may receive data indicating one or more potential network failures based on monitoring the requests to the recovery server 114. In response, the performance server 108 may instruct the direct monitoring of video data packet traffic at one or more affected receivers. For example, the performance server 108 may instruct the router 122 to monitor video packet traffic to the first STB 130 when requests for lost video packets sent by the first STB 130 indicate a potential network failure.

Using directly monitored video data packet traffic, a more accurate estimate of video quality at the receiver may be generated. The more accurate estimate may be used as a basis of further diagnostic measures if a network failure is detected. Additional information may be collected by other network elements to provide a more complete picture of network performance to detect and diagnose problems. For example, the performance server 108 may detect that video data packet traffic to a particular STB is impaired and may instruct all routers along the transmission path to monitor video data packet traffic to the STB. The resulting traffic data may be compared to stored traffic signatures associated with network failures to predict a source of the impairment.

In addition, the directly monitored video data packet traffic may be used to improve future estimates of video quality based on requests to the recovery server 114 by correlating retransmission request patterns and actual video data packet traffic patterns. Signatures or patterns of retransmission requests may be identified as being correlated to specific types of video data packet delivery failures, to general data packet delivery failure, to problematic, near-problematic, or non-problematic video quality at a receiver, or to any combination thereof.

The retransmission request data monitored at the router 112 or the recovery server 114, as well as the actual video data packet traffic to the receivers, may be compiled by the performance server 114 and used to determine network performance trends and to predict network failures. For example, current hour performance may be compared with performance from a previous hour, a previous day, or other period to detect performance trends. To illustrate, a detected trend may reveal that some subscribers may have poor video quality between 8-9 μm every weekday. Proactive or remedial steps may be implemented to improve video quality to the subscribers. Video quality to individual subscribers, as well as overall network performance, can be maintained and improved by detecting and proactively addressing such trends.

In a particular embodiment, a knowledge base may be maintained and updated in response to network activity and trends. The knowledge base may be located at a single server or may be distributed throughout one or more networks as one or more discrete, interconnected, or replicated databases or other applications. In an illustrative embodiment, the knowledge base may be located at the performance server 108.

Although the particular illustrative embodiment of the system 100 of FIG. 1 depicts a single acquisition server 104, recovery server 114, and four STBs 130, 140, 150, and 160, the system 100 can include any number of A-servers 104, D-servers 114, and multicast receiver devices such as STBs 130, 140, 150, and 160. Likewise, the system 100 can include additional servers, switches, routers, and other well-known network elements. Furthermore, although system 100 is illustrated as having routers 106, 112, 122, and 124 to perform packet traffic inspection and monitoring, the system 100 may include one or more switches, hubs, gateways, servers, or other network device capable of functioning as a branching point for multicast packet traffic. In addition, the system 100 may include multiple taps to perform packet inspection and monitoring.

In a particular embodiment, the system 100 may include an Internet Protocol Television (IPTV) system that is adapted to distribute multimedia content from multiple sources. The IPTV system can include a Super Video Head-End Office having multiple acquisition servers 104 to encode and distribute content from each source. The IPTV system can also include multiple Regional or Video Head-End Offices having multiple recovery servers 114 to distribute multimedia content to designated groups of multimedia receivers, such as the representative STBs 130, 140, 150, and 160. In a particular embodiment, the STBs 130, 140, 150, and 160 can include IPTV set-top box devices, video gaming devices or consoles that are adapted to receive IPTV content, personal computers or other computing devices that are adapted to emulate set-top box device functionalities, another device adapted to receive IPTV content and transmit data to an FPTV system via an access network, or any combination thereof.

Figure 2:
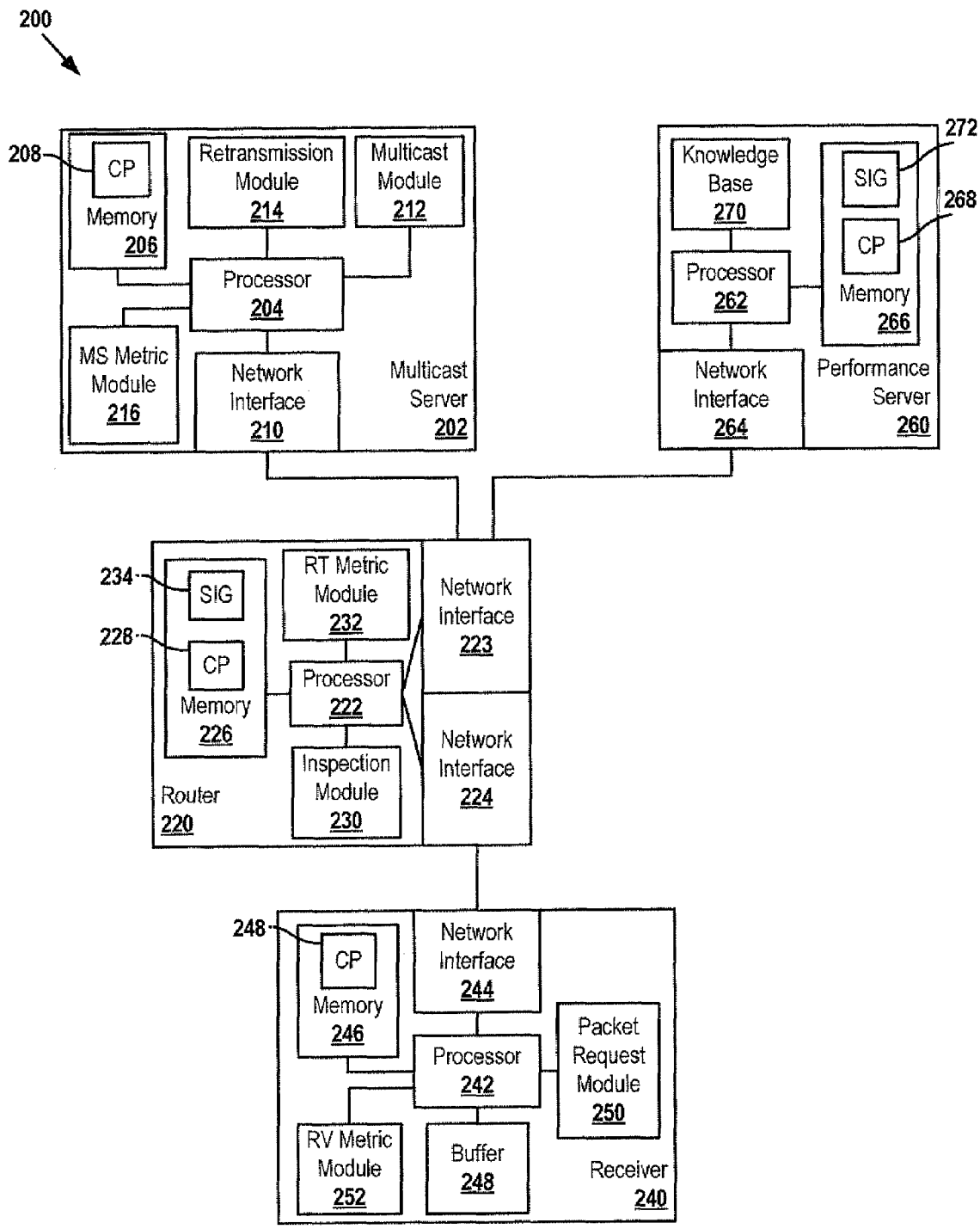
FIG. 2 is a block diagram of a second particular embodiment of a system to monitor video data packet delivery.

Referring to FIG. 2, a particular illustrative embodiment of a system to monitor video data packet delivery is depicted and generally designated 200. The system 200 includes a multicast server 202 in communication with a receiver 240 via a multicast branching device, such as a router 220. The multicast server 202 and the receiver 240 are further in communication with a performance server 260 via the router 220. The multicast server 202, the receiver 240, and the router 220 may operate in conjunction with a knowledge base 270 located at the performance server 260 to monitor multicast transmission performance data and to detect and diagnose network failures and to predict future network failures.

In a particular embodiment, the multicast server 202 includes a processor 204, a memory 206, a network interface 210, a multicast module 212, a retransmission module 214, and a multicast server metric module 216. In a particular embodiment, the memory 206 can include instructions that are executable by the processor 204, such as one or more computer programs 208.

The multicast module 212 may be executable by the processor 204 to send multimedia content to the receiver 240 via the network interface 210 and the router 220. In a particular embodiment, the multicast module 212 may be executable by the processor 204 to transmit video data via IP multicast, using Real-time Transport Protocol (RTP), for example. In a particular embodiment, the multicast module 212 may be executable by the processor 204 to associate a multicast packet sequence number to each packet of a multicast transmission.

The retransmission module 214 may be executable by the processor 204 to receive a message from the receiver 240 requesting retransmission of packets that were not received. In a particular embodiment, the retransmission module 214 may be executable by the processor 204 to retransmit requested packets via an Internet Protocol (IP) unicast. In a particular embodiment, the retransmission module 214 may also be executable by the processor 204 to receive and process messages from other receivers (not shown).

The multicast server metric module 216 may be executable by the processor 204 to analyze the retransmission requests to detect performance data associated with one or more multicast transmissions from the multicast server 202. In a particular embodiment, the multicast server metric module 216 may be executable by the processor 204 to record data related to a first number of video data packets of a multicast transmission that are not received by one or more multicast group members, such as the receiver 240. In a particular embodiment the multicast server metric module 216 may be executable by the processor 204 to record data related to a second number of lost retransmission packets that are sent to multicast group members but not received. In a particular embodiment, the multicast server metric module 216 may be executable by the processor 204 to record performance data corresponding to individual multicast receivers, aggregated data corresponding to one or more multicast transmissions, aggregated data based on network topology, aggregated data based on a time period, or any combination thereof.

In a particular illustrative embodiment, the multicast server metric module 216 may be executable by the processor 204 to compare performance data to one or more thresholds associated with multicast performance. In a particular embodiment, the multicast server metric module 216 may be executable by the processor 204 to send a message to the performance server 260 when at least one of the first number of lost video data packets and the second number of lost retransmission packets meets or exceeds a threshold. For example, the threshold may include a number of lost packets, a number of lost packets in a predetermined time period, a percentage of sent packets that are not received, a number of lost retransmission packets, a number of lost retransmission packets in a predetermined time period, a percentage of requested retransmission packets that are not received, or any combination thereof. In addition, the threshold may include a percentage of multicast destinations experiencing packet losses that exceed one or more thresholds, a number of total packets lost for all multicast destinations, a number of total packets lost over one or more predetermined time periods, or any combination thereof.

In a particular embodiment, the multicast server metric module 216 may be executable by the processor 204 to determine a trend indicating an impending threshold event based on prior performance data. In a particular embodiment, the multicast server metric module 216 may be executable by the processor 204 to predict an amount of time before a threshold will be met or exceeded. In a particular embodiment, the multicast server metric module 216 may be executable by the processor 204 to compare the predicted amount of time to a threshold amount of time, and send a message to the performance server 260 when the threshold amount of time is met or exceeded.

In a particular embodiment, the receiver 240 may include a processor 242 coupled to a network interface 244, a memory 246, a buffer 248, a packet request module 250, and a metric module 252. In a particular embodiment, the memory 246 may include instructions executable by the processor 242, such as one or more computer programs 248. In a particular embodiment, the receiver 240 may be adapted to receive P multicast packets via the network interface 244 and to store the multicast packets at the buffer 248. In a particular embodiment, the receiver 240 may be a network device or end-user device adapted to receive multicast multimedia content, such as the recovery server 114 or the STB 130 illustrated in FIG. 1.

The packet request module 250 may be executable by the processor 242 to access the buffer 248 and to detect one or more missing packets by examining multicast packet sequence identifiers or numbers of received packets. In a particular embodiment, the packet request module 250 may be executable by the processor 242 to generate and send a message to the multicast server 202 to request retransmission of the missing packets.

The receiver metric module 252 may be executable by the processor 242 to detect performance data associated with one or more multicast transmissions. In a particular embodiment, the receiver metric module 252 may be executable by the processor 242 to record a first number of lost video packets of a multicast transmission from the multicast server 202. In a particular embodiment, the receiver metric module 252 may be executable by the processor 242 to record a second number of lost retransmission packets that are requested from the multicast server 202 but not received.

In a particular embodiment, the receiver metric module 252 may be executable by the processor 242 to compare performance data to one or more thresholds associated with multicast performance. In a particular embodiment, the receiver metric module 252 may be executable by the processor 242 to send a message to the performance server 260 when at least one of the first number of lost video data packets and the second number of lost retransmission packets meets or exceeds a threshold. For example, the threshold may include a number of lost packets, a number of lost packets in a pre-determined time period, a percentage of sent packets that are not received, a number of lost retransmission packets, a number of lost retransmission packets in a predetermined time period, a percentage of requested retransmission packets that are not received, or any combination thereof.

In a particular embodiment, the receiver metric module 252 may be executable by the processor 242 to determine a trend indicating an impending threshold event based on prior performance data. In a particular embodiment, the receiver metric module 252 may be executable by the processor 242 to predict an amount of time before a threshold will be met or exceeded. In a particular embodiment, the receiver metric module 252 may be executable by the processor 242 to compare the predicted amount of time to a threshold amount of time and to send a message to the performance server 260 when the threshold amount of time is met or exceeded.

In a particular embodiment the router 220 includes a processor 222, a first network interface 223, a second network interface 224, a memory 226, an inspection module 230, and a router metric module 232. In a particular embodiment, the memory 226 can include instructions that are executable by the processor 222, such as one or more computer programs (CP) 228.

In a particular embodiment, the router 220 is a multicast router that is adapted to receive multicast video data packets from the multicast server 202 via the first network interface 223 and to send multicast video data packets to multicast group members, such as to the receiver 240 via the second network interface 224. In a particular embodiment, the router 220 is adapted to maintain and update multicast group information, such as by using Internet Group Management Protocol (IGMP).

The inspection module 230 may be executable by the processor 222 to perform deep packet inspection on packets received via the first network interface 223, the second network interface 224, or both. In a particular embodiment the inspection module 230 may be executable by the processor 222 to determine multicast sequence identifiers or numbers of one or more multicast packets received at the first network interface 223. In a particular embodiment, the inspection module 230 may be executable by the processor 222 to inspect one or more packet redelivery requests from one or more multicast destinations, such as the receiver 240, via the second network interface 224. The inspection module 230 may be executable by the processor 222 to determine a sender of the redelivery request, one or more multicast video data packets that are requested, other information associated with the redelivery request, or any combination thereof. Such retransmission request information may be stored in the memory 226 and processed by the processor 222 periodically, upon request, when a count of retransmission requests exceeds a threshold, or any combination thereof.

The router metric module 232 may be executable by the processor 222 to determine performance data associated with one or more multicast transmissions received at the first network interface 223. In a particular embodiment, the performance data may include a number of dropped packets at an input buffer (not shown) of the router 220, a number of dropped packets at an output buffer (not shown) of the router 220, a number of packet errors detected at the router 220, a rate of packets received for one or more multicast groups, a total number of packets received for one or more multicast groups, other performance data associated with one or more multicast groups or transmissions, or any combination thereof.

In a particular embodiment, the router metric module 232 may be executable by the processor 222 to record performance data and to determine one or more trends based on the recorded performance data. In a particular embodiment, the router metric module 232 may be executable by the processor 222 to generate and send a warning to the performance server 260 when performance data is predicted to exceed a threshold.

In a particular embodiment, the router metric module 232 may be executable by the processor 222 to receive signature data 234 associated with one or more types of delivery failure. For example, the signature data 234 may include data having a rate of received multicast packets that decreases overtime correspond to a delivery failure upstream of the router 220. As another illustrative, non-limiting example, the signature data 234 may include data indicating a number of discarded packets due to output buffer overflow increasing over time, which overflow may correspond to a delivery failure downstream from the router 220. The router metric module 232 may be adapted to compare the monitored performance data to the stored signature data 234 to predict a future delivery failure, to identify a present delivery failure, to identify a cause of a real or predicted delivery failure, or any combination thereof.

In a particular embodiment, the router metric module 232 may be executable by the processor 222 to continually monitor performance data and to compare the performance data to the signature data 234. The router metric module 232 may be executable by the processor 222 to send a warning to the performance server 260 when a delivery failure is predicted. In a particular embodiment, the router metric module 232 may be executable by the processor 222 to send at least a portion of the performance data to the performance server 260 when a request is received from the performance server 260, such as to supply an additional layer of detail to the knowledge base 270 to diagnose a network delivery problem. In a particular embodiment, the router 220 may be adapted to add, replace, or update the signature data 234 with additional signature data received from the knowledge base 270 at the performance server 260.

In a particular embodiment, the router metric module 232 may be executable by the processor 222 to only monitor and record particular performance data when a request for the particular performance data is received from the performance server 260. In a particular embodiment, the request may indicate one or more types of data to monitor and one or more time periods for the router 220 to perform the monitoring. In a particular embodiment, the request may specify data related to multicast packet traffic, packet errors, dropped packets, data acquired by deep packet inspection, or any combination thereof.

The performance server 260 may include a processor 262, a network interface 264, a memory 266, and a knowledge base 270. In a particular embodiment, the memory 266 can include instructions that are executable by the processor 262, such as one or more computer programs 268. In a particular embodiment, the performance server 260 is configured to communicate with one or more multicast servers including the multicast server 202, one or more network devices including the router 220, and one or more multicast destination devices including the receiver 240 via the network interface 264.

The knowledge base 270 may be executable by the processor 262 to receive network traffic data and other metric data and to compare the received data to data corresponding to distinct network traffic signatures to generate a proper response. In addition, the knowledge base 270 may store, update, and otherwise maintain signature data 272 that corresponds to various network problems. For example, the signature data 272 may be stored as one or more databases or other files at the memory 266. Instructions generated by the knowledge base 270 may be transmitted by the performance server 270 to recipients throughout the system 200. In a particular embodiment, the knowledge base 270 may be local instance of an intra-network or inter-network distributed knowledge base.

In a particular embodiment the knowledge base 270 may be executable by the processor 262 to receive data from the receiver 240 indicating a first number of multicast video data packets not received at the receiver 240, a second number of failed redelivery requests of the receiver 240, other performance data or metrics associated with video data packets, or any combination thereof. The knowledge base 270 may be executable by the processor 262 to determine that one or more thresholds are exceeded based on the received performance data. In a particular embodiment, the knowledge base 270 may be executable by the processor 262 to determine that one or more thresholds are exceeded based on aggregated performance data from multiple receivers, multicast servers, network devices, or any combination thereof.

In a particular embodiment, the knowledge base 270 may be executable by the processor 262 to query multiple network devices for performance metrics corresponding to multicast video data packets. For example, the knowledge base 270 may be executable by the processor 262 to instruct one or more multicast branching points between the multicast sever 202 and the receiver 240, including the router 220, to send performance data corresponding to multicast video data packets that are sent by the multicast server 202 to a multicast group that includes the receiver 240.

In a particular embodiment, the knowledge base 270 may be executable by the processor 262 to identify a delivery failure. In a particular embodiment, the knowledge base 270 may be executable by the processor to determine a cause of a delivery failure, such as a failed network card, by comparing current performance data to signature data 272. The signature data 272 may identify one or more packet delivery failure signatures based on recorded performance data preceding one or more prior delivery failures. In a particular embodiment, the knowledge base 270 may instead identify one or more delivery failures based at least partially on messages or warnings received from devices of the system 200, or only using received performance data without using signature data.

In a particular embodiment, the knowledge base 270 may be executable by the processor 262 to initiate a response to the delivery failure. In a particular embodiment, the response may include sending a notice to one or more administrators of the system 200, automatically redirecting network traffic, other responses appropriate to the delivery failure, or any combination thereof.

In a particular embodiment, the knowledge base 270 may be executable by the processor 262 to update the signature data 272 based at least partially on received performance data. The knowledge base 270 may be executable by the processor 262 to send at least a portion of the updated signature data 272 to one or more multicast video data packet monitoring devices, including the router 220.

During operation, data corresponding to one or more metrics relating to network performance may be communicated to the knowledge base 270 via the network interface 264. For example, the metrics may exhibit levels or trends indicating abnormal activity, the source of which has not been determined. The knowledge base 270 may be configured to store and maintain signature data 272 corresponding to various network problems. In a particular embodiment, data may come from the multicast server 202, the receiver 240, the router 220, a passive or active deep packet inspection network element such as one or more firewalls (not shown), one or more other network elements, or any combination thereof.

The knowledge base 270 may compare the received metric data to signature data 272 that is stored at the knowledge base. The knowledge base 270 may include signature matching logic (not shown) that uses techniques such as pattern recognition and matching to determine whether the received metric data corresponds to one or more signatures of the signature data 272 within a particular confidence level.

Each signature may represent a pattern of activity corresponding to a particular event. For example, the signature data 272 may maintain one or more signatures that correspond to network traffic patterns and network metric data that occur when a network card fails. Other signatures may correspond to traffic patterns and network metric data that are detected upon the failure or diminished performance of other network elements, such as servers, receivers, transmission lines, routers, other network elements, or any combination thereof. In addition, other signatures may correspond to external sources of network abnormalities, such as sun spots, power outages, and severed transmission lines, as illustrative, non-limiting examples In a particular embodiment, the knowledge base 270 may be configured to receive both stateful metric data and stateless metric data, as well as to store and maintain signature having stateful data, stateless data, or any combination thereof. As an example, a network element may detect that a multicast traffic flow has a multicast packet rate beneath a threshold, and may send the stateless data (i.e., traffic rate) to the knowledge base. However, a network element using deep packet inspection may further be able to identify state data such as specific sequence numbers of dropped or transmitted multicast video data packets, and may send stateful metric data (e.g., a number of consecutive dropped packets based on packet sequence number) to the knowledge base 270. As another example, a network element may be able to send not only a current metric value, but also historical values of the metric to enable the knowledge base 270 to associate trending data with a signature.

The knowledge base 270 may be configured to provide multiple detail layers of signature pattern matching. For example, an initial message to the knowledge base 270 may include only key metric points, such as multicast discards, multicast errors, video data packet retransmission requests, or other key measurements. If the metric information that is provided to the knowledge base 270 in the initial request matches multiple signatures above a specified degree of certainty, such as above a predetermined correlation threshold, the knowledge base 270 may not be able to determine a single result. The knowledge base 270 may therefore request additional measurements or metric data for further comparisons. This process may be repeated until a sufficiently detailed amount of data has been provided that enables the knowledge base 270 to identify a signature within a predetermined confidence level, or until it is determined that the uncertainty cannot be resolved. A specific illustrative example of multiple detail levels of signature matching is provided in conjunction with the performance server 108 illustrated in FIG. 1, instructing the router 122 to monitor video packet traffic (i.e., a second detail level) when requests for lost video packets sent by the first STB 130 (i.e., a first detail level) indicate a potential network failure.

When a signature has been determined to match the received data within a desired confidence level, a source of the abnormal activity that is associated with the determined signature may be provided to an appropriate responder. For example, if a failed network element has been determined to be the source of abnormal network activity, the knowledge base 270 may initiate a work order that identifies the failed network element to be replaced.

In addition, the knowledge base 270 may include extrapolation logic (not shown) to predict one or more sources of network problems based on received data. For example, received data indicating intermittent periods of multicast delivery failure along a particular multicast branch may be diagnosed as matching the signature of a multicast router that will fail within the next twenty-four hours. Thus, the knowledge base 270 may predict impending failures and may proactively initiate notices or work orders for repair, reducing network downtime and improving overall service and content delivery.

Individual signatures of the signature data 272 may be created and maintained based on technical knowledge, machine learning techniques, other sources of information, or any combination thereof. For example, when a new type of network element is introduced to the system 200, the provider of the network element may supply signature data that identifies various failure modes of the new network element. However, in a particular embodiment the signature data supplied by the provider of the network element may be adaptive to actual data measured in conjunction with actual physical failures of the network element.

In a particular embodiment, the knowledge base 270 stores requests including traffic and metric data identifying abnormal behavior as a knowledge base request file (not shown) at the memory 266. When a source of the abnormal behavior is diagnosed from the signature data 272 via pattern recognition or other comparison techniques, a work order may be initiated, and corresponding data may also be stored at the knowledge base request file. When the actual source of the abnormal behavior is determined, such as by a technician replacing, repairing, or otherwise identifying the problem source, the knowledge base request file may be updated and used to improve the knowledge base 270 via a feedback process that updates or modifies the signature data 272.

For example, when the knowledge base 270 predicts cause "A" for a particular behavior but the actual cause is determined to be "B," a signature for "A" may be modified to discount future predictions based on similar data to the data stored at the knowledge base request file. Similarly, the signature for "B" may be modified to increase future predictions based on the same data. In an illustrative embodiment, the feedback process may include generating a training set to train one or more neural networks to refine knowledge base predictions based on the traffic and metric data.

In a particular embodiment, when a source of an abnormality is determined that is not currently identified in the signature data 272, a new signature file may be generated using the data stored in the knowledge base request file. As additional network abnormalities are diagnosed as having a corresponding source, the new signature file may be updated to improve future predictions.

In addition to a feedback process, the signature data 272 may also be updated based on other criteria. For example, a particular signature that has not generated a corresponding prediction in a specified amount of time, such as three years, may be identified as an outdated or obsolete signature, and may be archived or simply deleted. As another example, signature files may be added or deleted based on the addition or removal of network elements.

In addition, in a particular embodiment, the knowledge base 270 may distribute the signature data 272 to network elements such as the router 220, the multicast server 202, and the receiver 240. To conserve network resources, the distributed data may only contain high-level or coarse signature information for preliminary detection of abnormalities by the network elements. Upon detection of a potential abnormality by comparison with local signature data, the network element may forward the traffic or metric data to the knowledge base 270 for further analysis.

Figure 3:
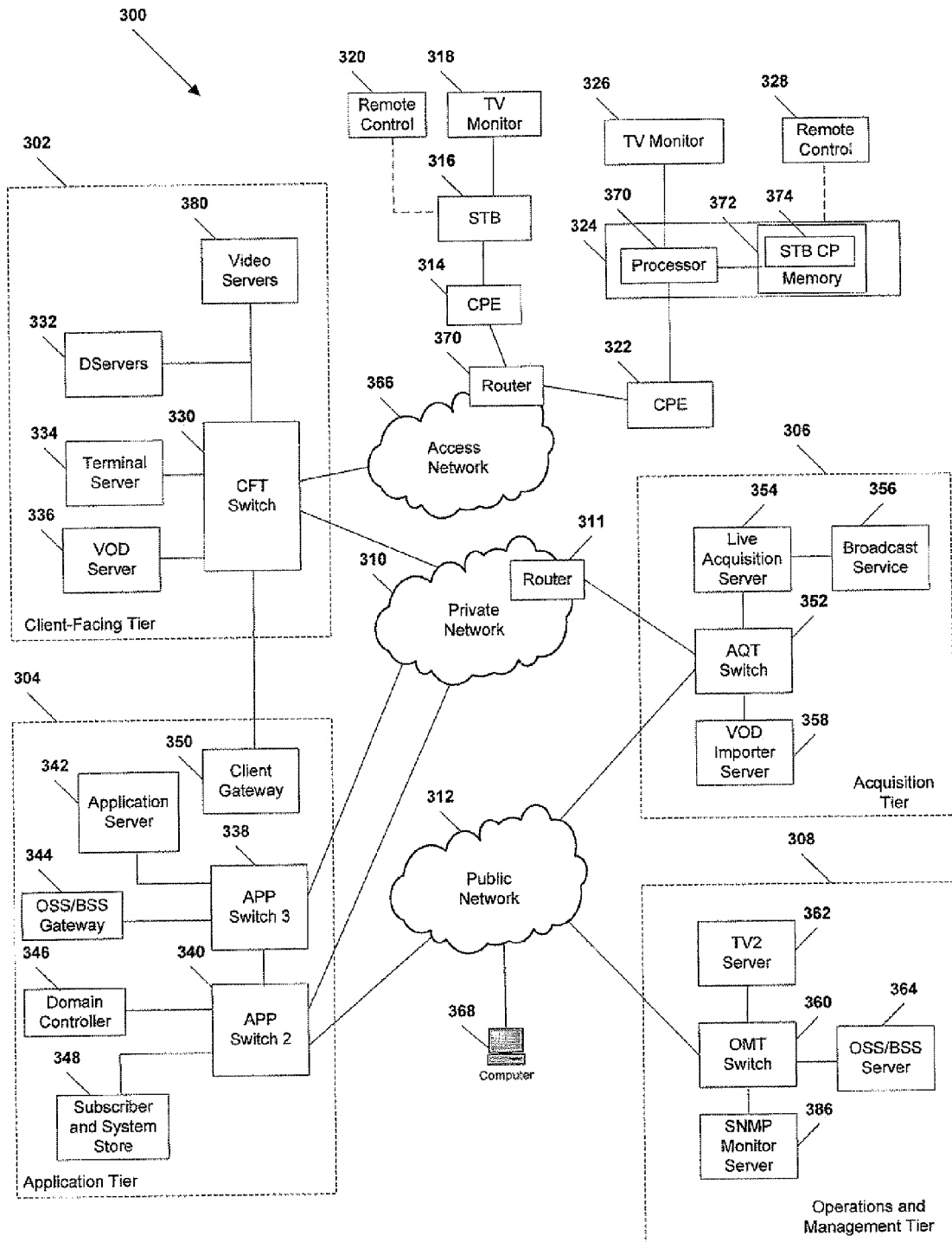
FIG. 3 is a block diagram of an Internet Protocol Television (IPTV) system.

Referring to FIG. 3, an illustrative embodiment of an Internet Protocol Television (IPTV) system that may be used monitor video data packet delivery is illustrated and is generally designated 300. As shown, the system 300 can include a client facing tier 302, an application tier 304, an acquisition tier 306, and an operations and management tier 308. Each tier 302, 304, 306, 308 is coupled to a private network 310; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 3310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an Internet Protocol Television (IPTV) access network. In an illustrative embodiment, customer premises equipment (CPE) 314, 322 can be coupled to a local switch, router, or other device of the access network 366, such as a first representative router 370. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise. In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment the CPE 314, 322 can be digital subscriber line (DSL) modems that are coupled to one or more network nodes via twisted pairs, and the client-facing tier 302 can be coupled to the network nodes via fiber-optic cables. Each set-top box device 316, 324 can process data received via the access network 366, via an IPTV software platform, such as Microsoft® TV IPTV Edition.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can include a STB processor 370 and a STB memory device 372 that is accessible to the STB processor 370. In one embodiment, a computer program, such as the STB computer program 374, can be embedded within the STB memory device 372.

In a particular embodiment, the set-top box devices 316, 324 can be adapted to record performance data associated with receiving media content such as multicast video data packet streams from the access network 366. The set-top box devices 316, 324 may be adapted to determine that a performance threshold has been reached or will soon be reached, and to send a warning of the threshold event via the access network 366. In an illustrative embodiment, the threshold event can correspond to video data packets that are not received, failed redelivery requests for lost video data packets, other metrics associated with receiving video data at the set-top box devices 316, 324, or any combination thereof.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more data servers, such as U-servers 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302. In a particular embodiment, the CFT switch 330 can be coupled to a video-on-demand (VOD) server 336 that stores or provides VOL) content imported by the IPTV system 300. Further, the CFT switch 330 is coupled to one or more video servers 380 that receive video content and transmit the content to the set-top boxes 316, 324 via the access network 366. In a particular embodiment, the video servers 380 or the D-servers 332 may be adapted to compare performance data associated with delivery of video data via the access network 366 to one or more performance thresholds, and to generate a warning message when the performance data indicates that a performance threshold has been or is predicted to be exceeded. Performance data may include video data packets not received at the video servers 380 or the D-servers 332, or video data packets sent by the video servers 380 but not received at one or more of the set-top box devices 316, 324. Performance data may also include failed requests for redelivery of video data packets. The failed requests can be sent by the video servers 380 or the D-servers 332, or sent by the set-top box devices 316, 324 to the video servers 380.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

In a particular embodiment, the CFT switch 230, the first router 370 and other routers or switches (not shown) of the access network 366 can function as multicast branching points for transmissions from the video servers 380 to set-top box devices 316, 324. In a particular embodiment, one or more of the multicast branching points, such as the first router 370, may be adapted to monitor performance metrics such as packet discards, packet errors, and packet traffic associated with individual multicasts. Performance metrics exceeding threshold values, or predicted to exceed threshold values, may cause a warning to be generated and sent to a network monitoring system. In a particular embodiment, the first router 370 may be adapted to perform deep packet inspection to acquire and monitor additional data associated with multicast video data delivery.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/OSS gateway 344 includes operation systems and support (OSS) data, as well as billing systems and support (BSS) data. In one embodiment, the OSS43SS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store 348 can store data associated with capabilities of set-top box devices associated with particular customers. In a particular embodiment, the subscriber and system store 348 can store data associated with one or more quality of service levels for various set-top box devices associated with particular customers. Packet delivery performance thresholds for each set-top box device may be determined at least partially based on the quality of service data.

In a particular embodiment, the application tier 304 can include a client gateway 350 that communicates data directly to the client-facing tier 302. In this embodiment the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/0535 gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment the AQT switch 352 can be coupled to a live acquisition server 354 that receives or acquires television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310. In a particular embodiment, the content can be sent via IP multicast via one or more network devices, such as a second representative router 311, adapted to monitor multicast performance metrics and to report when the performance metrics exceed or are expected to exceed threshold values.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324. In an illustrative embodiment, the live acquisition server 354 can send the content via IP multicast, and can monitor delivery metrics such as lost packets and failed packet retransmission attempts.

Further, the AQT switch 352 can be coupled to a video-on-demand importer server 358 that receives and stores television or movie content received at the acquisition tier 306 and communicates the stored content to the VOL) server 336 at the client-facing tier 302 via the private network 310. Additionally, at the acquisition tier 306, the video-on-demand (VOD) importer server 358 can receive content from one or more VOL sources outside the IPTV system 300, such as movie studios and programmers of non-live content. The VOL) importer server 358 can transmit the VOD content to the AQT switch 352, and the AQT switch 352, in turn, can communicate the material to the CFT switch 330 via the private network 310. The VOL) content can be stored at one or more servers, such as the VOD server 336.

When users issue requests for VOD content via the set-top box devices 316, 324, the requests can be transmitted over the access network 366 to the VOL) server 336, via the CFT switch 330. Upon receiving such requests, the VOL) server 336 can retrieve the requested VOD content and transmit the content to the set-top box devices 316,324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol (SNMP) monitor 386 that monitors network devices within or coupled to the IPTV system 300. In a particular embodiment, the OMT switch 360 can communicate with the AQT switch 352 via the public network 312.

In a particular embodiment, the SNMP monitor 386 can be adapted to receive delivery performance warnings or data from the set-top box devices 316, 324, the D-servers 332, the video servers 380, the live acquisition server 354, and multicast switching devices such as the routers 311, 370, the CFT switch 330, and the AQT switch 352. In addition, the SNMP monitor 386 can receive performance warnings or data from one or more taps along multicast paths, such as the tap 170 of FIG. 1. In a particular embodiment, the SNMP monitor 386 can query one or more devices for additional performance data to diagnose a multicast delivery failure. In a particular embodiment, the system 300 may further include one or more performance servers (not shown), such as the performance server 260 of FIG. 2, to perform additional monitoring and diagnostic functions associated with multicast content delivery throughout the system 300. In a particular embodiment, the system 300 may include one or more knowledge bases to maintain and update signature files associated with specific network delivery failures, such as the knowledge base 270 illustrated in FIG. 2.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

Figure 4:
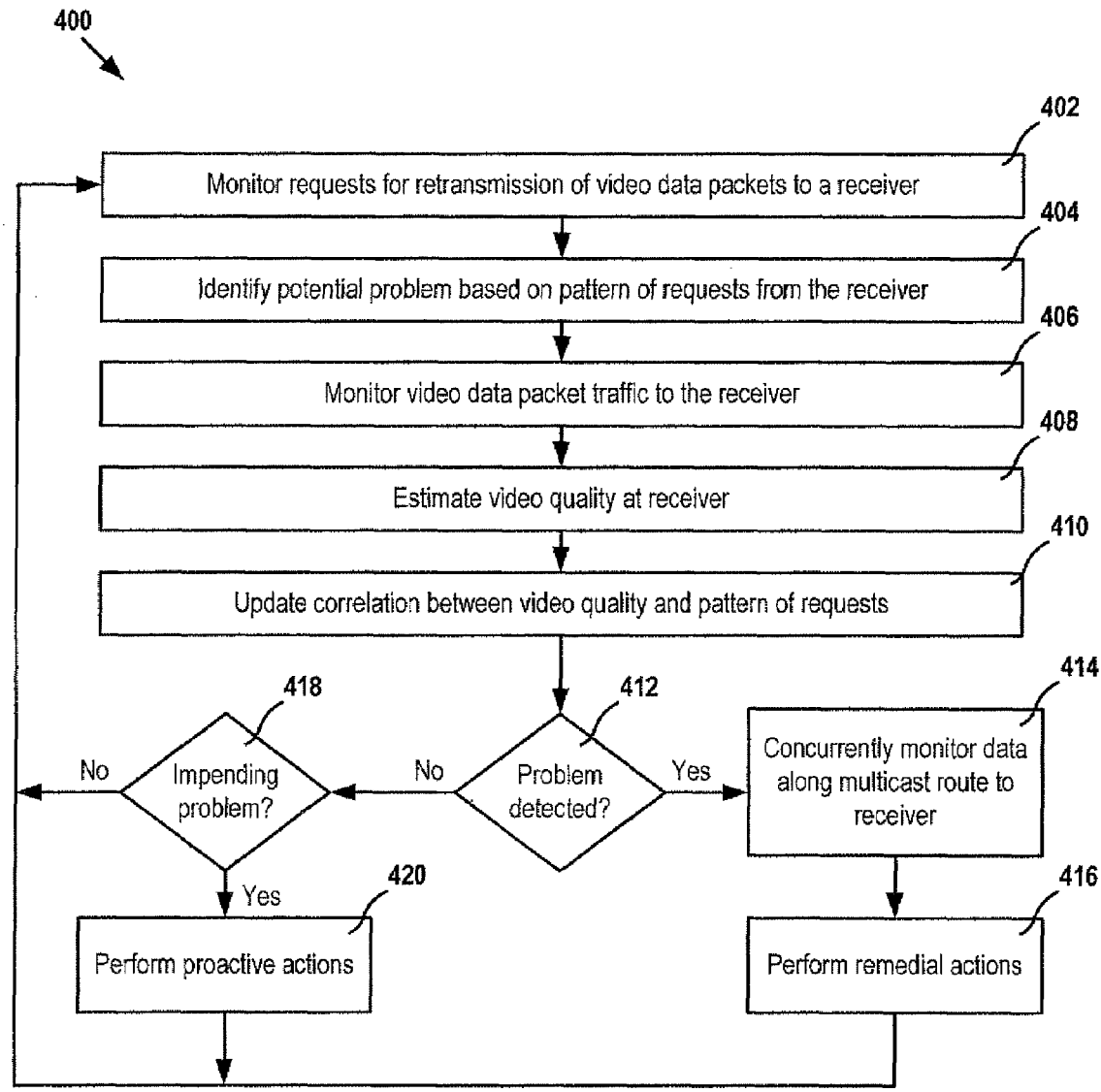
FIG. 4 is a flow chart of a particular embodiment of a method of monitoring video data packet delivery.

Referring to FIG. 4, a flow chart of a particular illustrative embodiment of a method of monitoring video packet delivery is depicted and generally designated 400. Requests for retransmission of video data packets to a receiver may be monitored, at 402. The requests may be sent to a server that resends lost multicast packets, such as the recovery server 114 of FIG. 1. In a particular embodiment, the requests may be sent by one or more set-top box devices, such as the STBs 130, 140, 150, and 160 of FIG. 1.

Moving to 404, a potential problem may be identified based on a pattern of requests from the receiver. For example, a potential problem may be identified based on a number of requests for video packet retransmission, an interval between consecutive requests, a ratio of requested packets, other metrics that may exceed a threshold value, or any combination thereof.

Continuing to 406, video data packet traffic to the receiver may be monitored. For example, traffic data may be collected at a router or tap near the receiver and monitored at a performance server, such as the performance server 108 of FIG. 1. Advancing to 408, video quality at the receiver may be estimated based on the monitored video data packet traffic. Progressing to 410, a correlation between video quality at the receiver and the pattern of requests for resending video data packets may be updated to improve future video quality estimates.

Moving to decision step 412, a determination may be made whether a video quality problem is detected. As an illustrative, non-limiting example, a video quality problem may be detected if a number of lost packets per unit time exceeds a threshold. In a particular embodiment, when a video quality problem is detected, processing continues to 414, where data is concurrently monitored at multiple points along the multicast route from a multicast server to the receiver to locate or diagnose the problem. Advancing to 416, remedial actions may be performed to correct the problem.

Otherwise, when a video quality problem is not detected at 412, a determination may be made whether a problem is impending, at 418. For example, an impending problem may be detected when one or more performance metrics exhibit a trend indicating a threshold value may be exceeded within a particular time period. When a determination is made that a problem is impending, proactive actions may be performed, at 420. Processing returns to 402, where requests for retransmission of video data packets are monitored.

Figure 5:
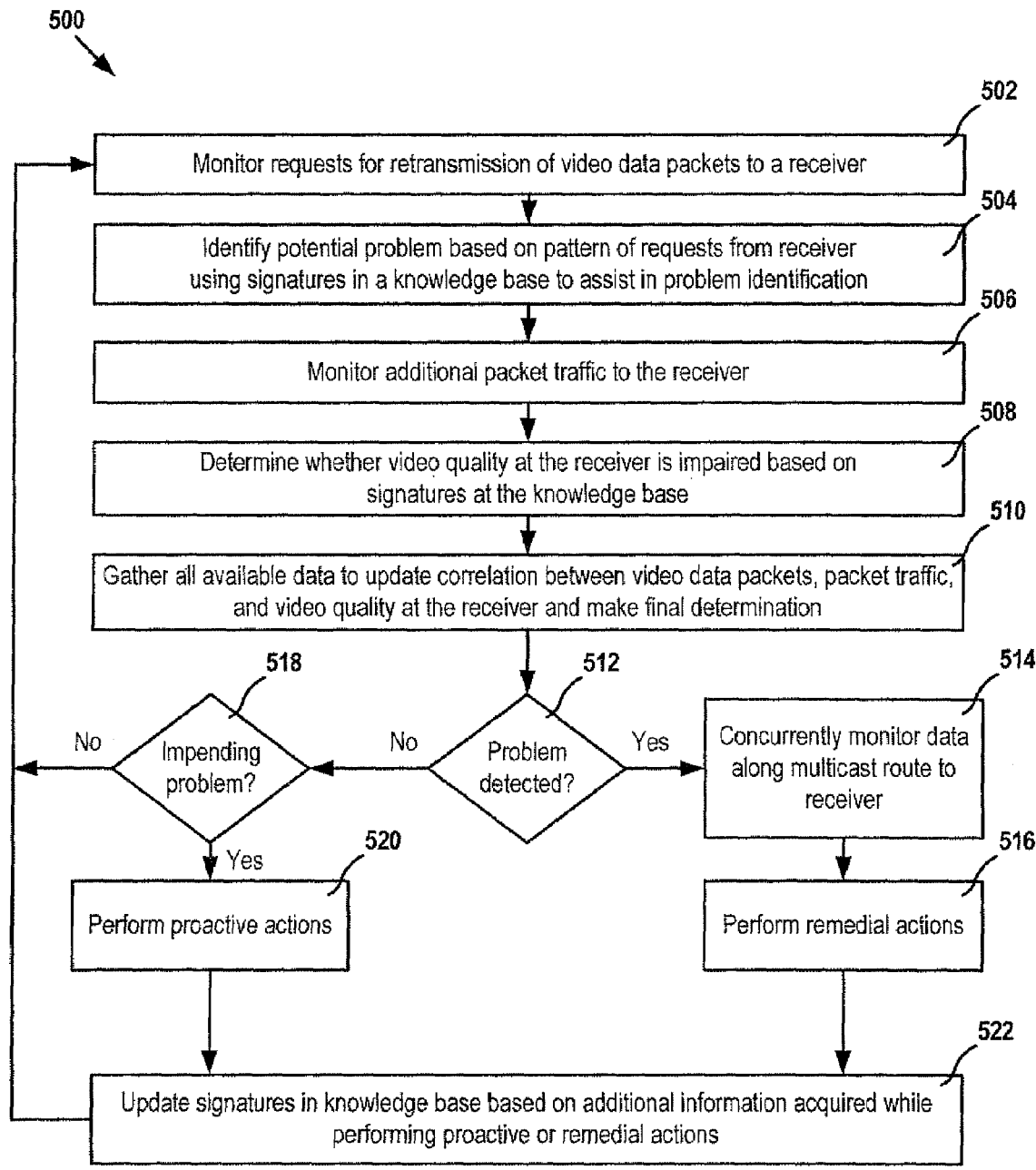
FIG. 5 is a flow chart of a second particular embodiment of a method of monitoring video data packet delivery.

Referring to FIG. 5, a flow chart of a second illustrative embodiment of a method of monitoring video packet delivery is depicted and generally designated 500. In a particular embodiment, the method 500 illustrates an example of using signature files of a knowledge base, such as the signature data 272 of the knowledge base 270 depicted in FIG. 2, in conjunction with elements of the method 400 depicted in FIG. 4.

Requests for retransmission of video data packets to a receiver may be monitored, at 502. The requests may be sent to a server that resends lost multicast packets, such as the retransmission module 214 of the multicast server 202 depicted in FIG. 2. In a particular embodiment the requests may be sent by one or more receiver devices, such as the receiver 240 depicted in FIG. 2. The receiver devices may be set-top box devices, such as STBs 130 of FIG. 1.

Moving to 504, a potential problem may be identified based on a pattern of requests from the receiver by using signatures in a knowledge base to assist in problem identification. For example, a potential problem may be identified based on a number of requests for video packet retransmission, an interval between consecutive requests, a ratio of requested packets, other metrics that may individually or collectively be compared against the signatures stored at the knowledge base, or any combination thereof. In a particular embodiment, any or all of the above metrics may be provided to the knowledge base, which may perform pattern matching to identify one or more signature files corresponding to the pattern of requests and identifying a particular potential problem.

Continuing to 506, video data packet traffic to the receiver may be monitored. For example, when the identified signature files matching the pattern of request identifies one or more particular potential problems, the knowledge base may generate instructions to one or more network elements, such as the router 220, to collect traffic data near the receiver and to send the traffic data to the knowledge base. Advancing to 508, a determination of whether video quality at the receiver is impaired based on signatures at the knowledge base may be made. Progressing to 510, all available data is gathered and used to update and store at the knowledge base correlation data between video data packet requests, packet traffic, and video quality at the receiver, and to make a final determination of whether a video quality problem exists.

Moving to decision step 512, a determination may be made whether a video quality problem is detected. As an illustrative, non-limiting example, a video quality problem may be detected when the pattern of requests or the packet traffic, or both, match one or more signature files at the knowledge base within a certain degree of confidence. In a particular embodiment, when a video quality problem is detected, processing continues to 514, where the knowledge base may receive an additional layer of detail concerning the detected problem in the form of data generated by concurrently monitoring packet traffic at multiple points along the multicast route from a multicast server to the receiver to locate or diagnose the problem. The data acquired by concurrent monitoring may be compared to the signature files at the knowledge base to diagnose and locate a cause of the detected video quality problem.

Advancing to 516, remedial actions may be performed to correct the problem. For example, the knowledge base may initiate a repair process, such as by generating a work order to replace or repair a malfunctioning network element.

Otherwise, when a video quality problem is not detected at 512, a determination may be made whether a problem is impending, at 518. For example, an impending problem may be detected by comparing all available data to signature files that indicate impending problems. Examples of signature files that may represent impending problems may include signature files reflecting an intermittent malfunction, a reduced capacity, or an upward trend in delivery failures. When a determination is made that a problem is impending, proactive actions may be performed, at 520.

Continuing to 522, after either remedial actions are performed at 516 or proactive actions are performed at 520, signatures in the knowledge base may be updated based on additional information acquired while performing the proactive or remedial actions. For example, a technician dispatched to replace a malfunctioning network element may instead discover another cause of the video quality problem. The actual cause may be associated with all corresponding data used to diagnose the problem in the knowledge base, and one or more signature files of the knowledge base may be updated to improve future diagnoses at the knowledge base. Updating the signature files may include adding new signature files when the cause is not yet associated with a signature file in the knowledge base. Processing returns to 502, where requests for retransmission of video data packets are monitored. In a particular embodiment, an accuracy of the knowledge base in detecting or diagnosing network delivery problems may improve with increased usage of the knowledge base and feedback operations, such as performed at 510 and 522.

Figure 6:
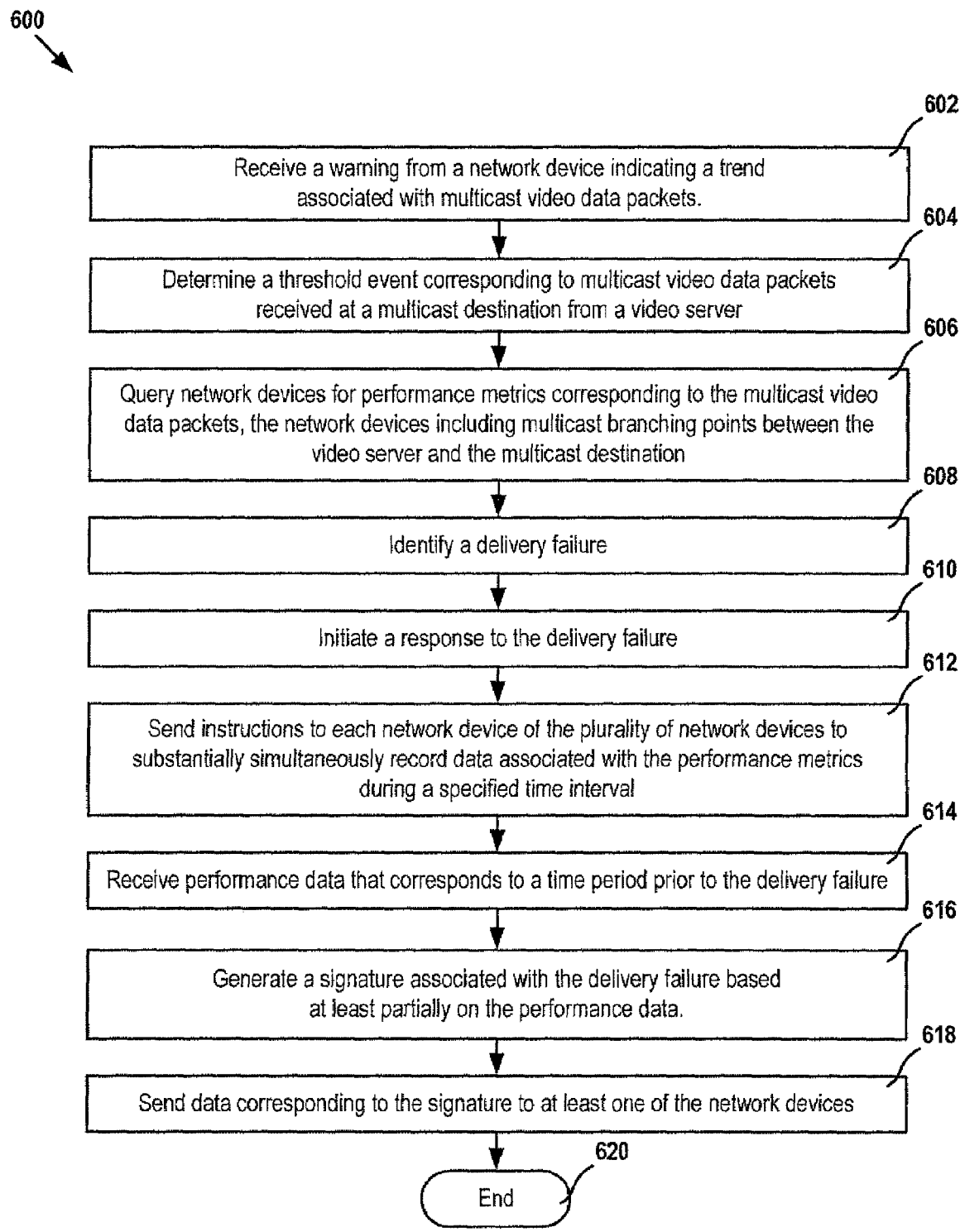
FIG. 6 is a flow chart of a third particular embodiment of a method of monitoring video data packet delivery.

Referring to FIG. 6, a flow chart of a third illustrative embodiment of a method of monitoring video packet delivery is depicted and generally designated 600. At 602, in a particular embodiment, a warning is received from one or more network devices. The warning may indicate a trend associated with multicast video data packets. In a particular embodiment, the warning may indicate a prediction that a rate of loss of the multicast video data packets will exceed a threshold. In a particular embodiment, the warning may indicate a prediction that a number of failed packet recovery requests will exceed a threshold.

In a particular embodiment, the warning may be received from a network device does not include a switch or router. In an illustrative embodiment, the warning may be received at a knowledge base server of a multimedia content delivery system, such as the performance server 260 hosting the knowledge base 270 of FIG. 2.

Continuing to 604, in a particular embodiment, a threshold event corresponding to receiving video data packets at the multicast destination from a video server may be determined. In a particular embodiment, the threshold event may correspond to a number of multicast video data packets that are not received at the multicast destination. In another embodiment, the threshold event may correspond to a number of failed packet recovery requests.

Advancing to 606, multiple network devices may be queried for performance metrics corresponding to multicast video data packets, the multicast video data packets sent from a video server of an internet protocol television system to a multicast destination. The network devices may include multicast branching points between the video server and the multicast destination. In a particular embodiment, the performance metrics may include a traffic metric associated with the multicast video data packets, a dropped packet metric, a packet error metric, or any combination thereof.

Moving to 608, a delivery failure is identified based on the performance metrics. Progressing to 610, a response to the delivery failure is initiated. In an illustrative embodiment, the response may include notifying one or more system administrators, redirecting network traffic, performing other remedial functions, or any combination thereof.

Continuing to 612, in a particular embodiment, instructions may be sent to each of the network devices to substantially simultaneously record data associated with the performance metrics during a specified time interval. Advancing to 614, in a particular embodiment performance data may be received from at least one of the network devices. The performance data may correspond to a time period prior to the delivery failure.

Moving to 616, in a particular embodiment, at least one signature associated with the delivery failure may be generated based at least partially on the performance data. Progressing to 618, in a particular embodiment data corresponding to the at least one signature may be sent to one or more of the network devices. The method terminates at 620.

Figure 7:
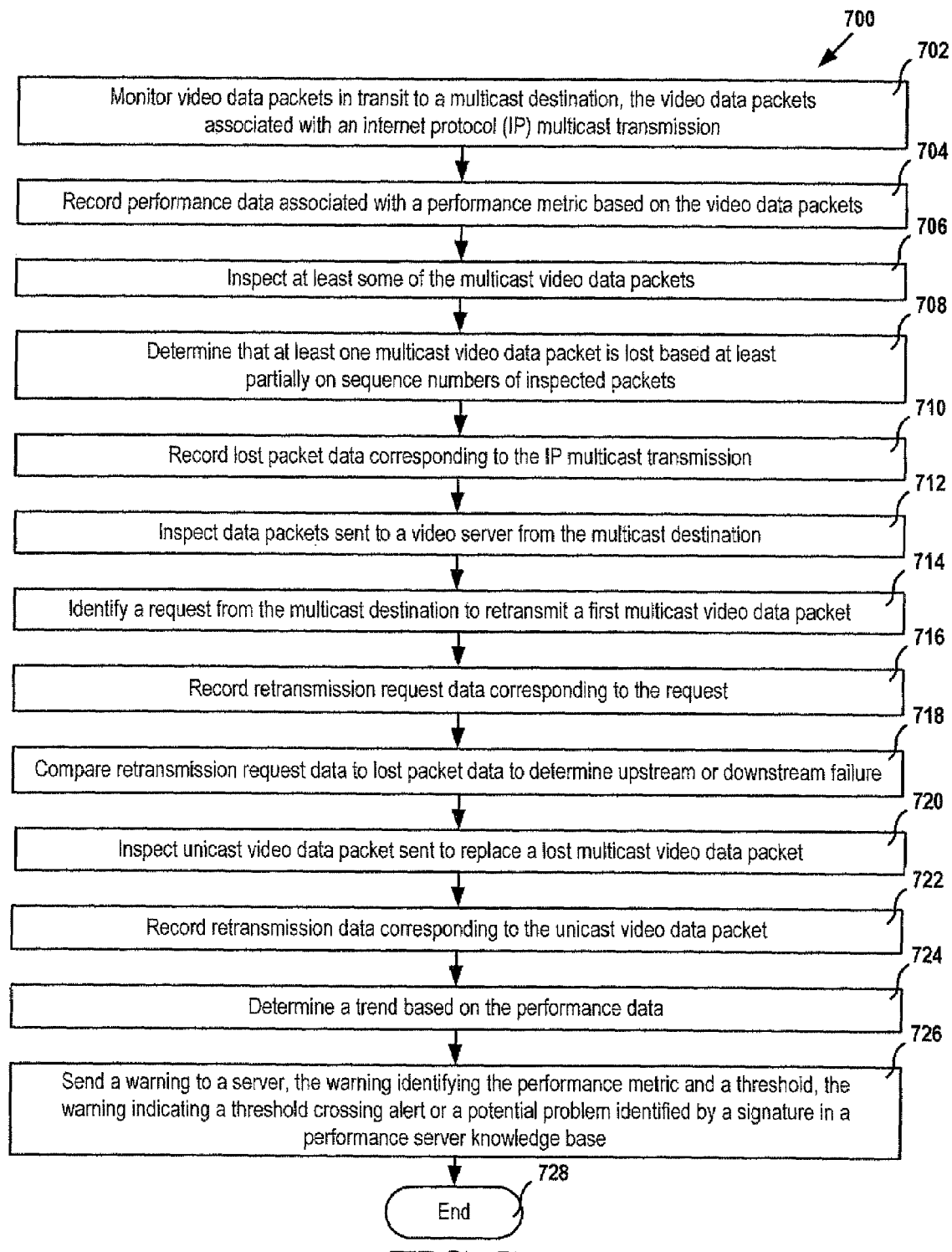
FIG. 7 is a flow chart of a fourth particular embodiment of a method of monitoring video data packet delivery.

Referring to FIG. 7, a flow chart of a fourth illustrative embodiment of a method of monitoring video packet delivery is depicted and generally designated 700. At 702, video data packets may be monitored in transit to a multicast destination, the video data packets associated with an internet protocol (IP) multicast transmission. In a particular embodiment, the monitoring may be performed by a network device, such as the router 220 of FIG. 2.

Continuing to 704, performance data associated with a performance metric based on the video data packets may be recorded.

In a particular embodiment, the video data packets may include multicast video data packets. Bach of the multicast video data packets may have a distinct sequence number associated with the IP multicast transmission. Progressing to 706, in a particular embodiment, at least some of the multicast video data packets may be inspected. Continuing to 708, in a particular embodiment, the router may determine that at least one multicast video data packet is lost based at least partially on sequence numbers of inspected packets. Advancing to 710, in a particular embodiment, lost packet data corresponding to the IP multicast transmission may be recorded.

Moving to 712, in a particular embodiment, data packets sent to a video server from the multicast destination may be inspected. Progressing to 714, a request from the multicast destination to retransmit a first multicast video data packet may be identified. Continuing to 716, retransmission request data corresponding to the request may be recorded.

Advancing to 718, in a particular embodiment, the retransmission request data may be compared to the lost packet data to determine at least one of an upstream delivery failure and a downstream delivery failure. To illustrate, a packet requested for retransmission but not included in the lost packet data was lost downstream of the router, i.e., between the router and the multicast destination. In contrast, a packet requested for retransmission that is included in the lost packet data was lost upstream of the router, i.e., between the router and the video server.

In a particular embodiment, the video data packets further include a unicast video data packet sent to the multicast destination to replace a lost multicast video data packet. Moving to 720, the unicast video data packet may be inspected. Progressing to 722, retransmission data corresponding to the unicast video data packet may be recorded.

Continuing to 724, a trend may be determined based on the performance data. Progressing to 726, a warning may be sent to a server, the warning identifying the performance metric and a threshold. The warning may indicate a threshold crossing alert or potential problem identified by a signature in a performance server knowledge base, such as the knowledge base 270 of the performance server 260 depicted in FIG. 2. The method terminates at 728.

Figure 8:
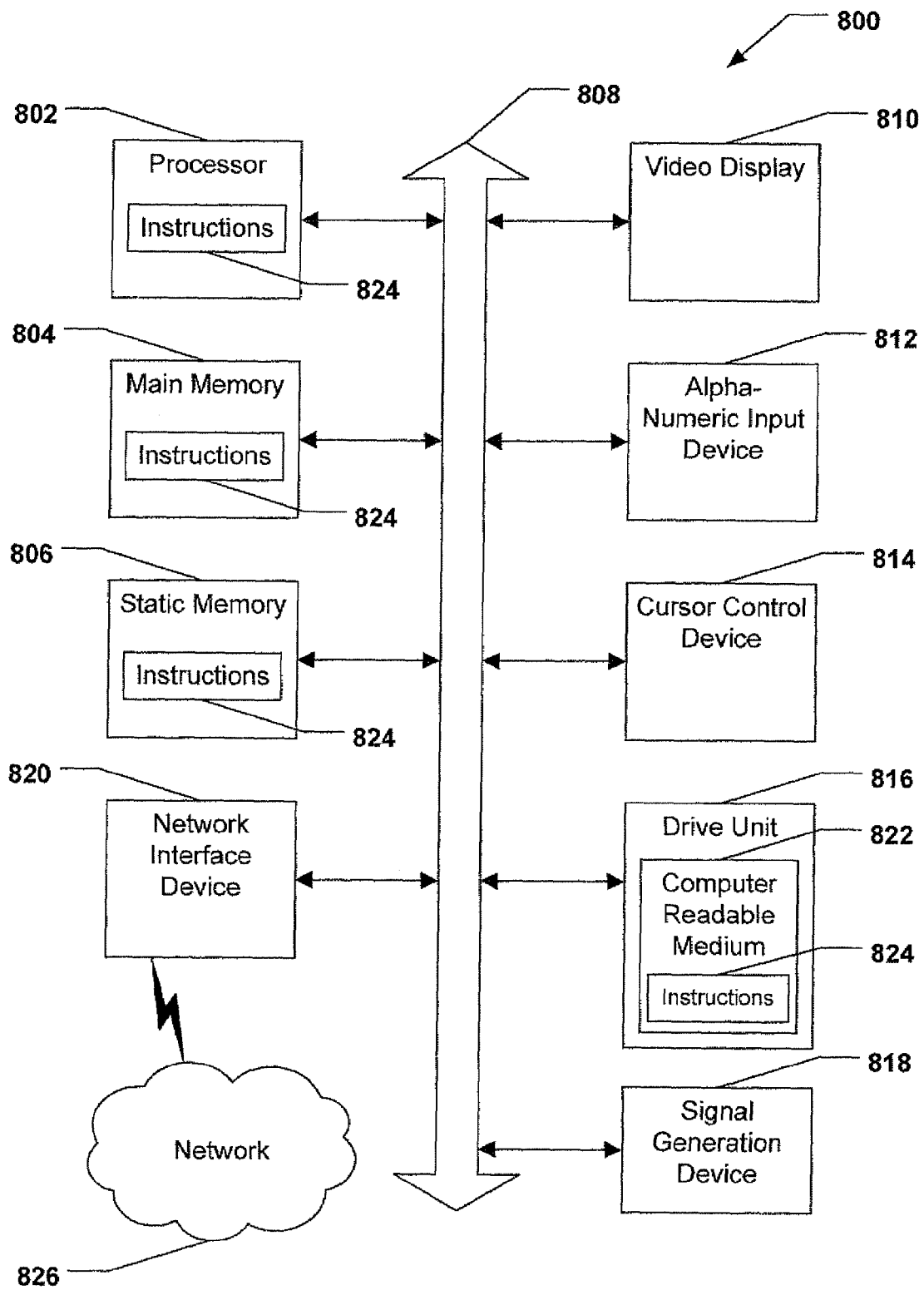
FIG. 8 is a block diagram of an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device, or may be connected, e.g., using a network, to other computer systems or peripheral devices, such as a multimedia content distribution system, an Internet Protocol Television (IPTV) system, a server system, such as a video server, a D-server, an A-server, or a performance server, a content source, a multimedia receiver, a set-top box device, a multicast router, switch or other network device, other devices, or any combination thereof. Additionally, in a particular illustrative embodiment, the computing system 800 can communicate with other computing devices via a local area network, a wireless network, or a public network, such as the Internet.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

In conjunction with the disclosed systems and methods, a video content delivery system enables proactive administration based on IP multicast transmission performance monitored at multiple points along a multicast transmission route. Various metrics may be used by different system resources to detect or predict multicast performance problems, and to notify a performance server of the actual or projected failure.

Video servers or set-top box devices may detect and record performance metrics including lost multicast packets or failed redelivery attempts. When the performance metrics are projected to exceed a threshold based on a trend, a warning may be sent to a performance server of the expected delivery failure.

The performance server may instruct network devices along the IP multicast transmission route to record and provide performance data relating to multicast video data packets, such as packet errors, dropped packets, and packet traffic. The network devices may be instructed to provide performance data for a specified time period, which may be combined at the performance server to generate a snapshot of multicast packet traffic along all or a part of a multicast transmission route. Problems such as failing network resources may be located and diagnosed, and corrective actions taken.

In addition, the network devices may monitor performance data for comparison to one or more delivery failure signatures. When the network device determines that the performance data indicates an impending delivery failure based on a similarity to one or more failure signatures, a warning may be sent to the performance server for corrective action.

As illustrated in FIG. 8, the computer system 800 may include a processor 802, e.g., a central processing unit (CPU), a graphics processing unit (GPU), or both. Moreover, the computer system 800 can include a main memory 804 and a static memory 806, that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
  receiving first data from an internet protocol television system at a performance server, wherein the first data is associated with requests received by a video server for retransmission of particular multicast video data packets, wherein the first data denotes a trend based on performance data associated with the particular multicast video data packets, and wherein the first data indicates a potential network failure;
  in response to the first data, querying, with a processor of the performance server, a plurality of network devices to receive performance metrics corresponding to multicast video data packets, wherein the network devices are multicast branching points between the video server and a multicast destination;
  comparing, with the processor, the performance metrics to a performance metric signature to identify an action to inhibit the potential network failure; and
  initiating the action from the performance server.

2. The method of claim 1, further comprising determining a threshold event corresponding to receiving video data packets at the multicast destination, wherein the threshold event corresponds to a number of the multicast video data packets that are not received at the multicast destination or corresponds to a number of failed packet recovery requests.

3. The method of claim 1, wherein the first data includes warnings, wherein a warning of the warnings indicates the trend associated with the multicast video data packets, wherein a first warning of the warnings indicates a first prediction that a rate of loss of the multicast video data packets is predicted to exceed a first threshold, and wherein a second warning of the warnings indicates a second prediction that a number of failed packet recovery requests is predicted to exceed a second threshold.

4. The method of claim 1, wherein the first data includes data from a first network device that does not include a switch or router.

5. The method of claim 1, wherein the performance metrics include a traffic metric associated with the multicast video data packets, a dropped packet metric, and a packet error metric.

6. The method of claim 1, wherein the multicast branching points include a switch, a hub, a gateway, a server, another network device capable of functioning as a branching point for multicast packet traffic, or combinations thereof.

7. The method of claim 1, wherein initiating the action includes sending a notice to a system administrator, redirecting network traffic, or both.

8. The method of claim 1, further comprising sending instructions to each network device of the plurality of network devices to substantially simultaneously record particular data associated with the performance metrics during a specified time interval.

9. The method of claim 1, further comprising:
receiving second performance data from a network device of the plurality of network devices, the second performance data corresponding to a time period prior to a delivery failure; and
generating a signature associated with the delivery failure based at least partially on the second performance data.

10. The method of claim 9, further comprising:
sending signature data corresponding to the signature to a network device of the plurality of network devices.

11. The method of claim 1, further comprising receiving the performance metric signature from a storage device coupled to the processor of the performance server.

12. The method of claim 1, wherein comparing the performance metrics to the performance metric signatures comprises:
receiving particular performance data corresponding to the performance metric;
identifying the performance metric signature, wherein the performance metric signature includes a threshold value;
comparing the particular performance data to the performance metric signature; and
when the particular performance data satisfies the threshold value, identifying the action as a particular action indicated by the performance metric signature.

13. A method comprising:
receiving first data from an internet protocol television system at a performance server, wherein the first data indicates a potential network failure and is associated with a number of multicast video data packets not received at a multicast destination, wherein the first data denotes a trend based on performance data associated with the multicast video data packets, and wherein the multicast video data packets are from a video server;
in response to the first data, querying, with a processor of the performance server, a plurality of network devices to receive performance metrics corresponding to the multicast video data packets, wherein the network devices are multicast branching points between the video server and the multicast destination;
identifying a delivery failure based on the performance metrics; and
initiating a response to the delivery failure.

14. The method of claim 13, further comprising receiving particular performance data corresponding to a time period prior to the delivery failure from network devices of the plurality of network devices in response to querying the plurality of network devices, the particular performance data indicating a first number of packets discarded due to errors.

15. The method of claim 14, further comprising performing pattern matching to compare the particular performance data to a signature representing a trouble pattern associated with the delivery failure.

16. The method of claim 13, further comprising receiving particular performance data corresponding to a time period prior to the delivery failure from network devices of the plurality of network devices in response to querying the plurality of network devices, the particular performance data indicating a first number of packets discarded due to network congestion.

17. The method of claim 16, further comprising performing pattern matching to compare the particular performance data to a signature representing a trouble pattern associated with the delivery failure.

18. The method of claim 13, wherein the performance metrics include a traffic metric associated with the multicast video data packets, a dropped packet metric, and a packet error metric.

19. A system comprising:
a processor;
a network interface accessible to the processor; and
a memory accessible to the processor, the memory having instructions that, when executed by the processor, cause the processor to perform operations including:
receiving first data from an internet protocol television system, wherein the first data indicates a potential network failure and is associated with a number of multicast video data packets not received at a multicast destination, wherein the first data denotes a trend based on performance data associated with the multicast video data packets, and wherein the multicast video data packets are from a video server;
in response to the first data, querying a plurality of network devices to receive performance metrics corresponding to the multicast video data packets, wherein the network devices are multicast branching points between the video server and the multicast destination;
identifying a delivery failure based on the performance metrics; and
initiating a response to the delivery failure.

20. The system of claim 19, wherein the operations further include receiving particular performance data corresponding to a time period prior to the delivery failure from network devices of the plurality of network devices in response to querying the plurality of network devices, the particular performance data indicating a first number of packets discarded due to errors and a second number of packets discarded due to network congestion.

21. The system of claim 20, wherein the operations further include causing the processor to perform pattern matching to compare the particular performance data to a signature representing a trouble pattern associated with the delivery failure, and wherein the signature is maintained at a storage device of an internet protocol television system that maintains signature data.

22. The system of claim 21, wherein the operations further include causing the processor to update the signature based on the particular performance data.

23. The system of claim 21, wherein the signature data maintained at the storage device is configured to represent a video trouble pattern, to identify a video delivery problem, or to identify a potential video delivery problem.

24. A server comprising:
a processor; and
a memory accessible to the processor, the memory having instructions that, when executed by the processor, cause the processor to perform operations including:
receiving first data from an internet protocol television system, wherein the first data is associated with requests received by a video server for retransmission of particular multicast video data packets, wherein the first data denotes a trend based on performance data associated with the particular multicast video data packets, and wherein the first data indicates a potential network failure;

in response to the first data, querying a plurality of network devices to receive performance metrics corresponding to multicast video data packets wherein the network devices are multicasting branching points between the video server and a multicast destination;

comparing the performance metrics to a performance metric signature to identify an action to inhibit the potential network failure; and initiating the action.

25. The server of claim 24, wherein the first data includes warnings, wherein a warning of the warnings indicates the trend associated with the multicast video data packets.

26. The server of claim 25, wherein the warnings include a first warning that indicates a first prediction that a rate of packet loss is predicted to exceed a first threshold and a second warning that indicates a second prediction that a number of failed packet recovery requests is predicted to exceed a second threshold.

27. A computer readable storage device having computer readable instructions stored thereon, when executed by a processor, cause the processor to perform operations including:

receiving first data from an internet protocol television system, wherein the first data is associated with requests received by a video server for retransmission of particular multicast video data packets, wherein the first data denotes a trend based on performance data associated with the particular multicast video data packets, and wherein the first data indicates a potential network failure;

in response to the first data, querying a plurality of network devices to receive performance metrics corresponding to multicast video data packets wherein the network devices are multicasting branching points between the video server and a multicast destination;

comparing the performance metrics to performance metric signatures to identify an action to inhibit the potential network failure; and initiating the action.

28. The computer readable storage device of claim 27, wherein initiating the action includes sending a notice to a system administrator, redirecting network traffic, or both.

* * * * *